United States Patent Office 3,095,246
Patented June 25, 1963

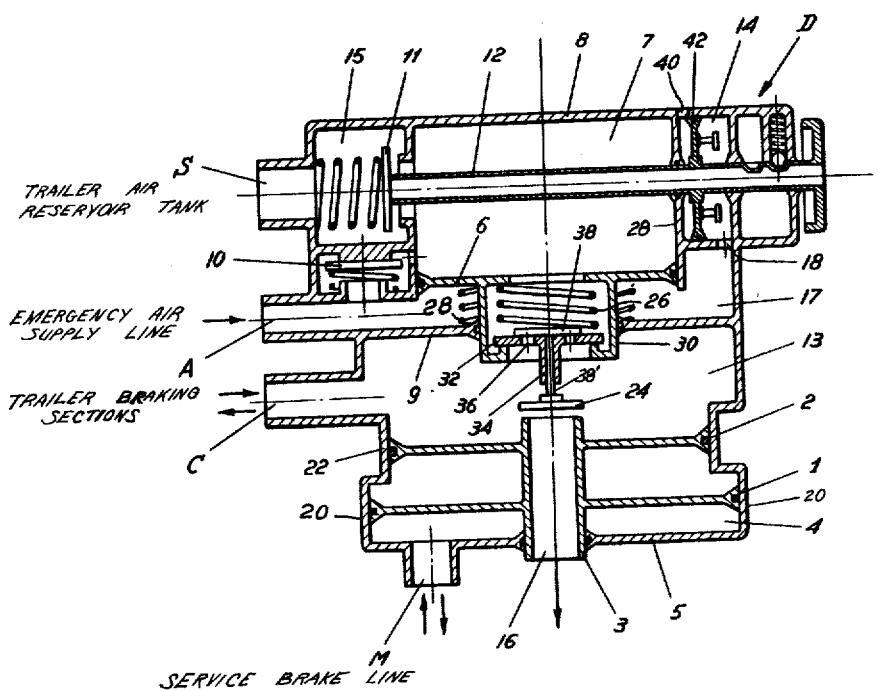

3,095,246
AUTOMATIC RELAY VALVE APPARATUS FOR PNEUMATIC BRAKING INSTALLATIONS ON TOWED VEHICLES
Giuseppe Alfieri, Milan, Italy, assignor to Fabbrica Italiana Magneti Marelli S.p.A., Milan, Italy, a firm
Filed June 23, 1960, Ser. No. 38,359
Claims priority, application Italy June 26, 1959
1 Claim. (Cl. 303—40)

The present invention relates to an automatic relay valve apparatus for pneumatic braking installations on towed vehicles and of the type essentially comprised of a service piston subjected to the air pressure of the service braking control, a second piston rigidly coupled to the service piston, and lastly, an emergency piston subjected at one of its sides to the pressure of the emergency braking control and its other side to the pressure of the feeding chamber connected to the trailer air reservoir tank.

In the above-described well known type of apparatus, the inlet and discharge valves constitute a single valve group controlled by the second piston whether in the normal braking phase, that is to say, when the service braking pressure acts on the service piston, or during automatic braking, that is when the displacement of the service piston is obtained by means of the thrust given to it by the emergency piston.

During either of the above-mentioned braking phases, the service piston and the emergency piston act in the same sense by bringing the second piston and associated exhaust seat to the exhaust valve with a resultant opening of the inlet valve. This system has two essential defects.

The first defect is due to the fact that the emergency piston is attached to the second piston, thus creating the necessity of making them equal in characteristics and dimensions. In practice, and because of the relationship between one piston and another during operations, the emergency piston must be of relatively larger dimensions. The other defect derives from the necessity of having two pressure chambers connected to each other and also to the trailer air reservoir tank. These two chambers are located at opposite extremities of the apparatus, and the upper one constitutes the feed chamber of the emergency piston while the lower one constitutes the feed chamber of the braking elements by means of the inlet valve. The connection between the valves and the air reservoir tank of the two chambers creates the necessity of providing in the apparatus holes and longitudinal pipes.

The object of the present invention is to eliminate the above-mentioned defects with the creation of a new automatic relay valve apparatus of simple construction and with very small overall space requirements.

It is characterized by the fact that the service piston and the emergency piston operate in opposite directions from the top and from the bottom towards the center of the apparatus as the valve unit is mounted directly on the emergency piston.

Over and above this, the apparatus is divided into two well defined zones; an upper section in which are connected the pipes and chambers constantly under pressure and a lower section to which the chambers and pipes subjected to the service brake pressure are connected.

Another characteristic is contained in the fact that the second piston reacts only during service braking phases and thus permits the adoption of an emergency piston of reduced dimensions. The only force required of said piston is in fact limited to the opening of the inlet valve.

The ulterior features of the invention are illustrated and described with reference to the attached drawing which is given only as an example and represents a preferred embodiment of the automatic relay valve.

FIG. 1 is an axial sectional view of the apparatus; and
FIG. 2 is a partial cross section of the apparatus turned 90° with respect to FIG. 1.

With reference to the drawing, 1 indicates the service piston and 2 indicates the second piston, both located in the respective cylinders 20 and 22 in the lower part 5 of the apparatus, and rigidly connected to each other by means of a rod 3 having a longitudinal bore 16.

The service piston 1 has a larger diameter than the second piston and is subjected to the pressure of air controlled by the service brake connected to pipe fitting M which opens into operating chamber 4 located in cylinder 20. During feeding phases, the piston group 1—2 moves from the bottom towards the top until the upper extremity of push rod 3 is brought to act on the discharge valve 24 of the valve group. Push rod 3 instead of having a longitudinal exhaust passage 16 could be closed at the lower end and provided with radial holes which would communicate with the annular chamber defined by pistons 1 and 2 and cylinders 20 and 22; the walls of cylinder 20 and 22 would have exhaust ports at this location.

The emergency piston 6 is urged upwardly by spring 26 against an abutment in the bottom of cylinder 28 formed in cover 8 of body or housing 5. Above said abutment is provided the operating chamber 7 of the piston 6. The lower part cylinder 28 is closed by an inner fixed wall 9 which retains the spring 26. Chamber 7 communicates with the air reservoir tank installed on the trailer by means of a pipe fitting S. The opposite chamber 17 is connected by pipe fitting A to the emergency braking control and by check valve 10 to the chamber 7.

If, as supposed, the apparatus is furnished with the hand brake release device D, communicating with chamber 7, communication between this latter and the coupling S for the air tank is made through valve 11 normally held open by control rod 12 of the device.

The features and the operation of the trailer braking and brake releasing device have been disclosed in my copending U.S. application Serial No. 29,875 filed May 18, 1960.

The emergency piston 6 provided with a hollow rod 30 is slidable in a hole formed in the fixed diaphragm 9 and provides the seat on which is directly mounted the valve group, and particularly the inlet valve disc 32. To said valve disc is fixedly connected a bushing 34 provided at the upper part with axial holes 36. Within the bore of said bushing is a slidable stem 38' provided at the upper part with a valve 38 which seats on the valve disc 32 so that there will be no communication between chambers 7 and 13.

During the automatic braking phase, the emergency piston 6 displaces itself from the top towards the bottom and its operation is completely independent of that of the second piston 2. As the only force required of this piston is the opening of the inlet valve 32, it is possible to construct piston 6 of very small dimensions.

The pipe directed towards the trailer braking section leads to pipe fitting C which communicates with the feed chamber 13 located between the diaphragm 9 and the second piston 2.

In the drawing, said chamber is in communication with the atmosphere by means of valve 24 of the valve group. Under these conditions, the automatic relay valve apparatus is disengaged (inactive) and the towed vehicle is actually in motion.

The apparatus is practically subdivided into two distinct sections: one upper section being always under pressure comprising chamber 17 in communication with operating chamber 14 of the brake releasing device piston 42 and chamber 7 which by means of pipe fittings A and S is connected to the emergency braking pipe and the tank pipe; and a lower section comprising chamber 4, connected by pipe M to the service brake control and chamber 13 which is connected by pipe fitting C to the trailer braking section.

The operation of the apparatus is as follows.

*Feeding of the Air Reservoir Tank*

The tank on the trailer is supplied with air under pressure from a pipe which supplies the emergency braking control; air flows through fitting A and passes through chamber 15 to the air tank through port S.

*Service Braking*

When the service braking is effected, air under pressure flows through the service brake fitting M and acts on the service piston 1 causing the closure of valve 24 and the opening of inlet valves 32 and 38. Thus, the brake operating means are supplied with air through coupling or pipe fitting S, chamber 7, valve 32, chamber 13 and coupling C.

Due to the difference in diameter between pistons 1 and 2, the braking power is differentiated due to the ratio relationship between the surfaces of said pistons. Obviously, said braking may be well balanced and kept so by equalizing or inverting the relationship of the diameters of the pistons 1 and 2.

When the service brakes are released, the air of the brake operating members discharges into the atmosphere through coupling C, chamber 13, discharge valve 24, and the internal conduit of push rod 3 in that pistons 1 and 2 are lowered and valves 32 and 38 are engaged by their respective seats.

*Automatic Braking*

When the trailer is uncoupled from the motor vehicle, the coupling A for the emergency brake and hence chamber 17 are connected to the outside at atmospheric pressure. The pressure in chamber 7 connected to tank coupling S consequently lowers piston 6 against the action of spring 26. Accordingly, the set of valves 24, 32 and 38 is lowered and, first, valve 24 is closed and then, air under pressure from coupling S supplies air to the brake operating members through chamber 7, valve 32, chamber 13 and coupling C. Braking of the trailer is therefore accomplished.

I claim:

An automatic relay valve for pneumatic braking systems installed on towed vehicles comprising a housing, a transverse partition mounted within said housing defining therewith an upper section and a lower section, a service piston and a second piston slidably mounted in the lower section, a first chamber defined by the service piston and one end of the housing, a second chamber defined by the second piston and said partition, the service piston having a larger diameter than the second piston, a piston rod connected between the service and second pistons, said piston rod provided with an axial duct connecting the second chamber with the atmosphere, a first pipe fitting secured to said housing for connecting said first chamber to a service brake pipe, a second pipe fitting secured to said housing for connecting said second chamber to a towed vehicle braking section, an emergency piston slidably mounted in the upper section and having one end slidably mounted in an opening formed in said partition, a third chamber defined by the third piston and said partition, a fourth chamber defined by said third piston and the other end of said housing, a third pipe fitting secured to said housing for connecting said third chamber to an emergency brake pipe, a fourth pipe fitting secured to the housing for connecting the fourth chamber to an air reservoir tank, spring means mounted between said partition and the emergency piston for biasing the third piston upwardly relative to said partition, said emergency piston having an axial bore formed therein for connecting the second chamber with the fourth chamber, valve means carried by the emergency piston within said bore for controlling the flow of air between the second chamber and the fourth chamber and between the second chamber and the atmosphere, said valve means comprising a seat formed within the bore of the emergency piston, a first inlet valve disc carried by the seat, said disc having a plurality of axial ports formed therein and a bushing depending therefrom, a second inlet valve disc carried by the first disc closing the ports, and a depending stem slidably mounted within the bushing, said stem having one end connected to the second disc and the other end connected to a discharge valve, whereby upon upward movement of the service and second pistons, the discharge valve seats against one end of the piston rod thereby lifting the second inlet valve disc to open the ports, further upward movement of the service and second pistons causing the discharge valve to engage the bushing to thereby lift the first valve disc from the seat and upon downward movement of the service and second pistons, the inlet valve discs engage their respective seats and the discharge valve is lifted off the end of the piston rod.

References Cited in the file of this patent

UNITED STATES PATENTS

| 2,062,500 | Casler et al. | Dec. 1, 1936 |
| 2,236,268 | Hewitt | Mar. 25, 1941 |
| 2,367,194 | Boldt | Jan. 16, 1945 |
| 2,645,239 | Horn et al. | July 14, 1953 |
| 2,759,569 | Keehn | Aug. 21, 1956 |
| 2,937,052 | Gates | May 17, 1960 |

FOREIGN PATENTS

| 433,638 | Italy | Feb. 12, 1941 |

UNITED STATES PATENT OFFICE
CERTIFICATE OF CORRECTION

Patent No. 3,095,246            June 25, 1963

Giuseppe Alfieri

It is hereby certified that error appears in the above numbered patent requiring correction and that the said Letters Patent should read as corrected below.

Column 2, lines 7 to 9, strike out

FIG. 1 is an axial sectional view of the apparatus; and
FIG. 2 is a partial cross section of the apparatus turned 90° with respect to FIG. 1.

Signed and sealed this 14th day of January 1964.

(SEAL)
Attest:

ERNEST W. SWIDER

Attesting Officer

EDWIN L. REYNOLDS

Acting Commissioner of Patents